Sept. 25, 1951     L. B. NEIGHBOUR ET AL     2,568,865
PORTABLE ELEVATOR
Filed April 5, 1946     4 Sheets-Sheet 1
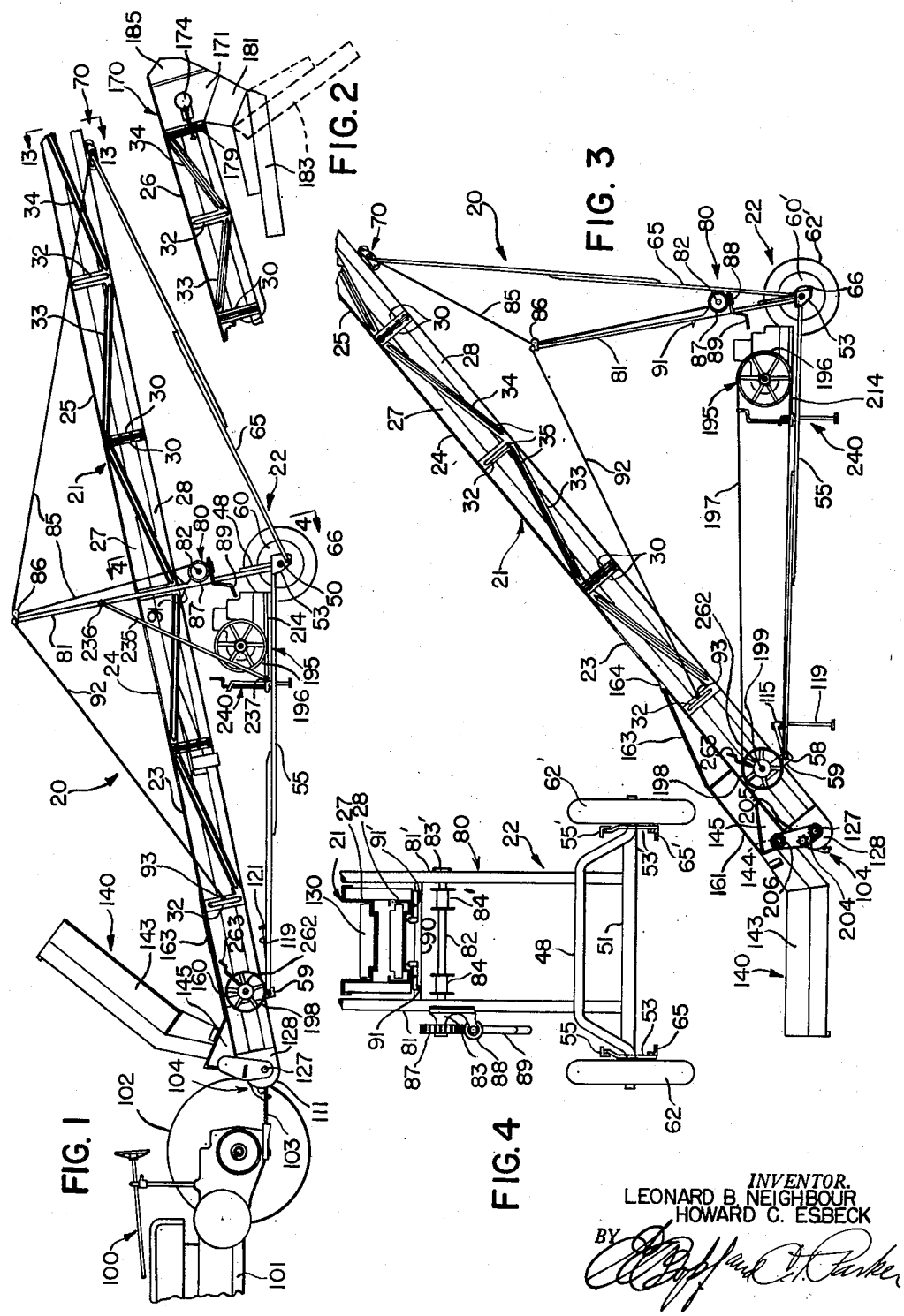
INVENTOR.
LEONARD B. NEIGHBOUR
HOWARD C. ESBECK
BY 

Sept. 25, 1951 — L. B. NEIGHBOUR ET AL — 2,568,865
PORTABLE ELEVATOR
Filed April 5, 1946 — 4 Sheets-Sheet 2
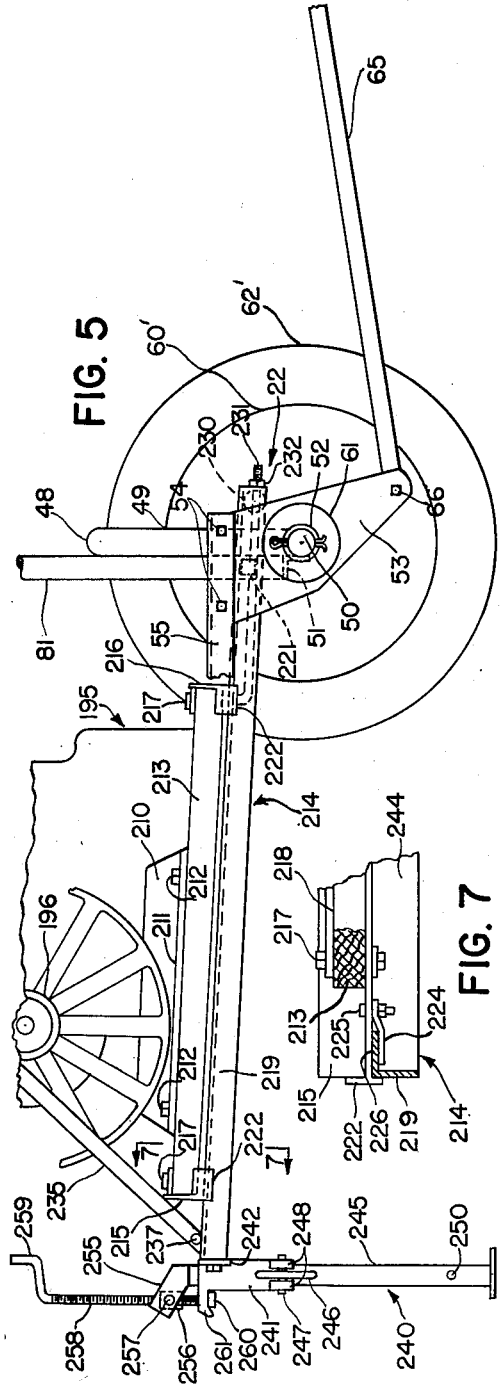
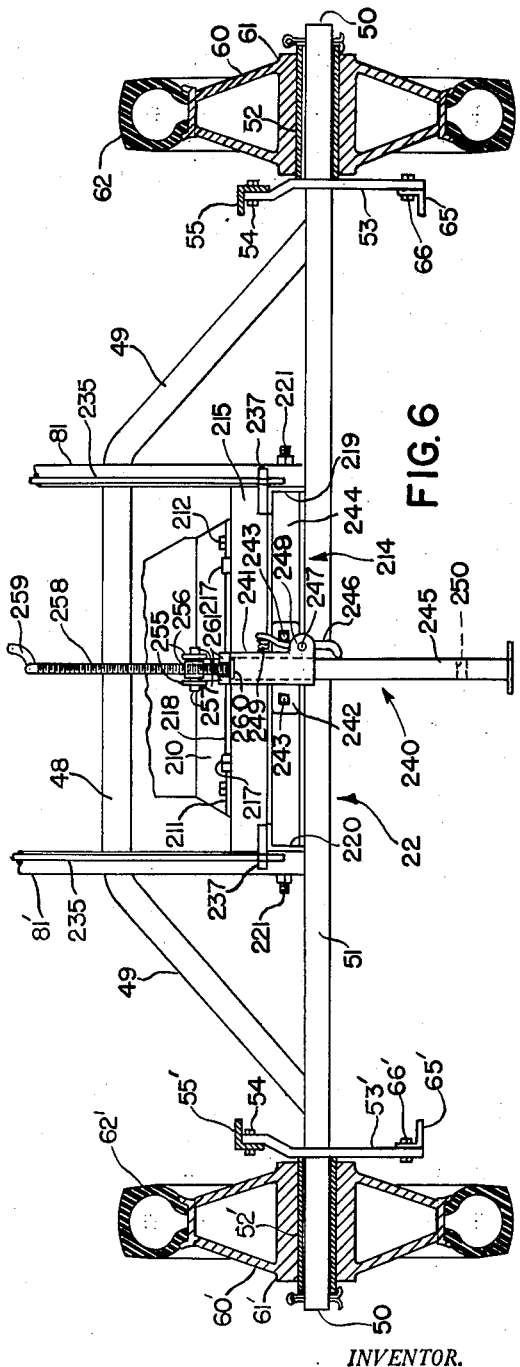
INVENTOR.
LEONARD B. NEIGHBOUR
HOWARD C. ESBECK
BY 

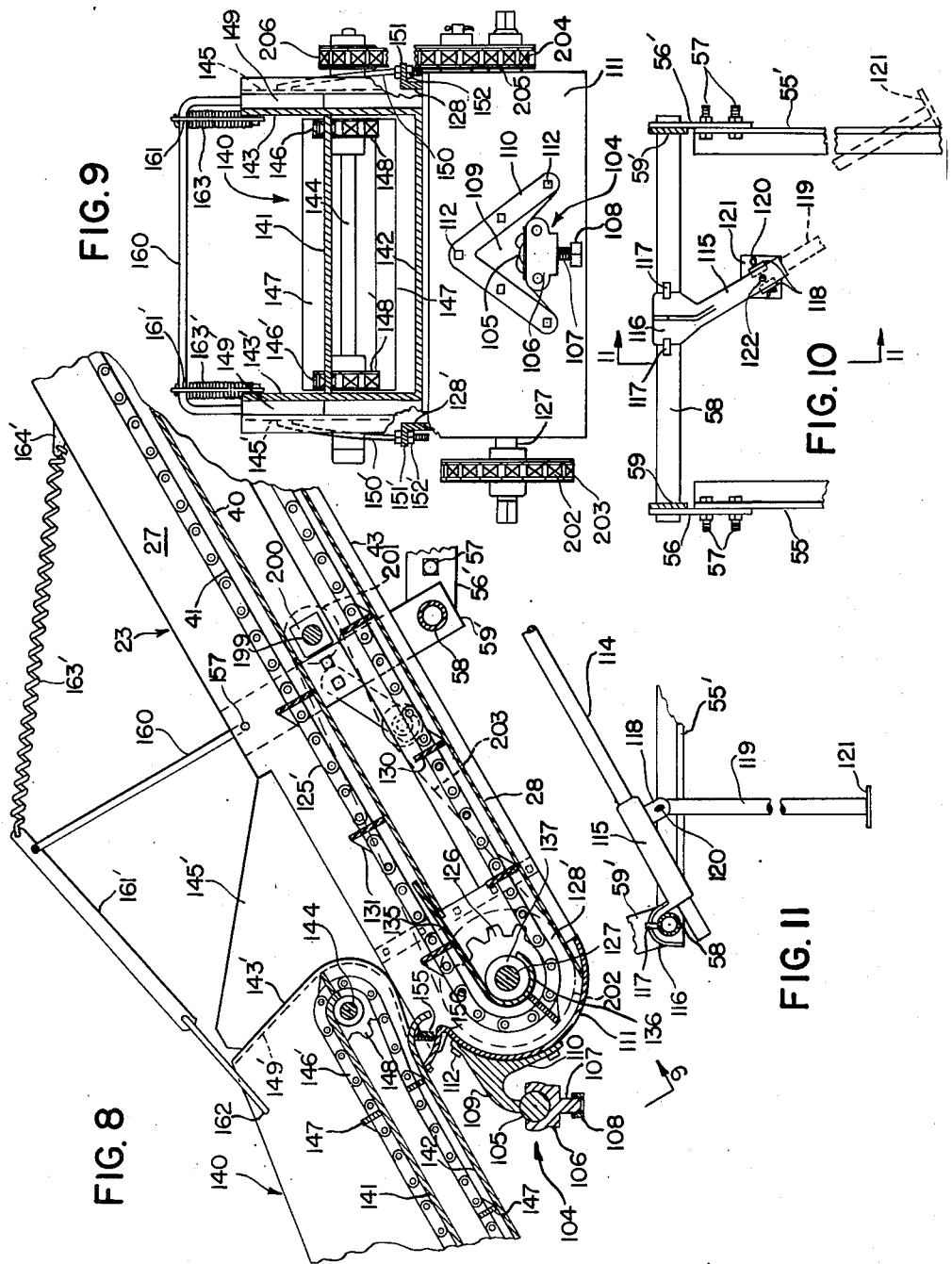

Sept. 25, 1951 L. B. NEIGHBOUR ET AL 2,568,865
PORTABLE ELEVATOR
Filed April 5, 1946 4 Sheets-Sheet 4
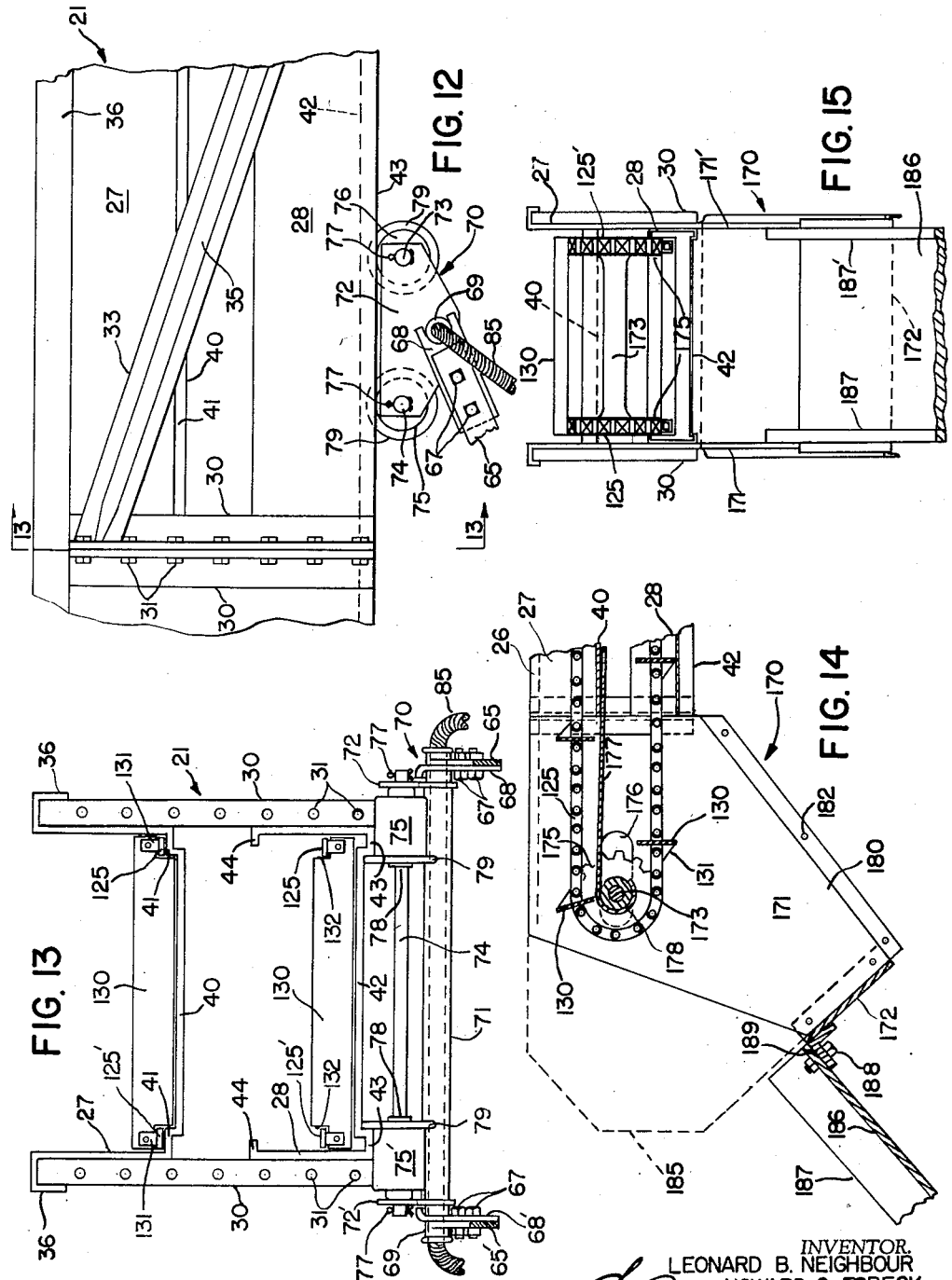
INVENTOR.
LEONARD B. NEIGHBOUR
HOWARD C. ESBECK
BY Patented Sept. 25, 1951

2,568,865

UNITED STATES PATENT OFFICE 2,568,865

PORTABLE ELEVATOR

Leonard B. Neighbour, Moline, and Howard C. Esbeck, Silvis, Ill., assignors to Deere & Company, Moline, Ill., a corporation of Illinois Application April 5, 1946, Serial No. 659,944

10 Claims. (Cl. 198—233)

The present invention relates generally to elevators and more particularly to portable elevators of the type which comprises a long main frame or trough carried on a supporting truck in a generally horizontal position, with a draft device at one end thereof which can be coupled to a tractor or truck for towing the elevator, while for operation the elevator trough can be raised to an inclined position for delivering conveyable material to a point at a higher elevation. The principal object of our invention relates to the provision of a novel and improved portable elevator, which is more easily maneuverable and adjustable and has improved efficiency, but without proportionate increase in weight or cost.

A further object relates to the provision of a portable elevator, which can be built in lengths up to fifty feet or more, which can be transported without the necessity for folding the main frame to decrease the total over-all length thereof, and without any danger of the elevator getting out of control when being transported behind a car or truck at reasonably high speeds. In the accomplishment of this object, a ball and socket type hitch device is fixed to the lower boot of the elevator, which can be mounted on the drawbar of a tractor or truck for transport purposes, and a transport truck is provided beneath the central portion of the main frame. A boom extends rearwardly from the truck and carries the rear end of the main frame thereon. The boom is raised and lowered to raise and lower the main frame by a system of cables supported on a lifting structure on the transport truck. For transport purposes, the boom is lowered until the main frame rests in stirrups on the lifting structure, thereby providing three points of support spaced at the two ends and in the center of the main frame, which effectively supports the latter and makes it unnecessary to fold the frame for transport. By connecting the main frame of the elevator directly to the tractor drawbar through a ball and socket joint, there is no tendency for the frame to whip from side to side during transport at high speeds, and furthermore, when the elevator is being moved into its operating position, there is no necessity for uncoupling it from the drawbar of the tractor until the latter has backed the elevator into its position of operation. The elevator is under control of the tractor operator at all times during its movement into operating position, by virtue of the two-wheeled supporting truck on which the elevator is carried.

A further object relates to the provision of a double cable system for raising and lowering the boom, with means for equalizing the lifting force on the two cables.

Still another object relates to the provision of a novel means for mounting the lifting boom, whereby during transport, the weight of the load on the boom is transmitted to the horizontal draft members of the transport truck in such a manner as to reduce the amount of sag in the long draft members, which extend from the transport truck to a point on the main frame near the hitch connection.

A still further object relates to the provision of rails formed in the bottom of the elevator trough by depressing a pair of channels along opposite sides of the trough. This also serves to strengthen the trough to reduce the sag thereof between points of support, and eliminates the necessity for structural angle or channel members secured to the bottom of the trough, which have heretofore been provided for stiffening the trough and also serving as rails along which the supporting wheels on the end of the boom are adapted to travel. A related object has to do with distributing the weight of the main frame or trough on the end of the boom by providing a four wheeled truck supported on the boom and adapted to engage the rails which are depressed below the bottom of the trough.

Another object relates to the provision of a novel and improved motor mounting on the elevator truck, which is supported from the lifting structure during transport, but has a retractable ground support which can be swung into ground engaging position to relieve the elevator structure of a considerable portion of the weight of the motor or power plant during operation of the elevator. A related object has to do with the provision for leveling the supporting platform for the motor or power plant.

Still another object relates to the provision of a retractable leg mounted on a jack lever at the draft end of the main frame, for lifting the latter to its mounted position on the tractor, and for facilitating lowering the end of the frame to the ground for operation.

Another object has to do with the provision of a receiving hopper at the lower end of the elevator, which can be swung between a receiving position lying on the ground and a transport position above the main frame and out of the way of the hitch device. A related object has to do with the provision of means for sealing the joints between the hopper and the main trough to prevent leakage of material in any position of the hopper relative to the main trough. Still a further related object has to do with the provision of means for adjusting the side walls of the hopper and trough relative to each other to close any cracks therebetween, through which material could leak.

A further object has to do with the provision of a novel and improved counterbalancing structure to facilitate raising the hopper relative to the main trough.

A further object has to do with the provision of a novel and improved transport truck structure, in which the horizontal draft members are swingably connected to the lifting structure in a manner which produces a wear resisting connection, to eliminate any appreciable loosening of the pivot joints due to wear.

A further object has to do with the adaptation of the elevator to handling a wide variety of materials, ranging from loose material such as gravel, grain and the like, to large bulky objects such as bales of hay. In the accomplishment of this object, we have provided a discharge chute beneath the discharge end of the conveyor for receiving bales of hay or other large objects, while a hood is provided to catch the loose grain or other loose material and deflect it downwardly and rearwardly under the end of the conveyor and behind the discharge chute.

These and other objects and advantages of our invention will be apparent to those skilled in the art after a consideration of the following description, in which reference is made to the drawings appended hereto, in which Figure 1 is a side elevational view showing a portable elevator embodying the principles of our invention mounted on the rear end of a tractor, the elevator being disposed in transport position, with the outer end thereof being broken away, and the near wheel of the tractor removed;

Figure 2 is a side elevational view of the end portion of the elevator which was broken away in Figure 1;

Figure 3 is a side elevational view of the elevator disposed in operating position, with the upper portion broken away;

Figure 4 is a sectional elevational view taken along a line 4—4 in Figure 1, showing the center support for the main elevator frame during transport;

Figure 5 is a fragmentary side elevational view, drawn to an enlarged scale, showing the mounting for the power plant support on the transport truck, and showing the retractable ground support in operating position;

Figure 6 is a front elevational view of the motor support, as viewed from the left in Figure 5, the wheels and bearing sleeves being shown in section;

Figure 7 is an enlarged sectional elevational view taken along a line 7—7 in Figure 5;

Figure 8 is a fragmentary sectional elevational view taken along a plane passing longitudinally along the axis of the elevator, showing the connected portion of the hopper trough and the main elevator trough, with sealing means therebetween;

Figure 9 is a sectional elevational view taken along a line 9—9 in Figure 8;

Figure 10 is a fragmentary plan view of the forward end of the transport truck, showing the forward ends of the draft beams and the jack lever for raising and lowering the elevator frame to and from mounted position on the tractor drawbar;

Figure 11 is a side elevational view taken in section along a line 11—11 in Figure 10 showing the jack stand in operating position;

Figure 12 is a fragmentary side elevational view, drawn to an enlarged scale, showing a portion of the main elevator frame and the supporting carriage on the end of the boom;

Figure 13 is a sectional view looking at the end of one of the frame sections, as viewed along a line 13—13 in Figure 12;

Figure 14 is a sectional elevational view taken along the longitudinal axis of the upper end of the conveyor frame, showing in solid lines the conveyor arranged to handle bales of hay or other large objects, and showing in dotted lines the position of a removable deflecting hood for use with loose grain or other material; and Figure 15 is an end view of the elevator head shown in Figure 14.

Referring now to the drawings, the portable elevator is indicated in its entirety by reference numeral 20 and comprises a main frame or elevator trough structure 21 and a transport truck or chassis 22 therefor. The main frame 21 comprises a long rigid structure comprising a series of unitary sections 23, 24, 25, 26, secured together in end to end relation, one end section 23 being adapted to rest upon the ground during operation and hence may be called the receiving end, while the opposite end section 26 is adapted to be elevated during operation and may be called the discharge end of the elevator.

Specifically, the main elevator frame 21 comprises a pair of upper and lower flight troughs 27, 28, formed of sheet metal and spaced apart vertically, one directly above the other. The two troughs 27, 28 are interconnected at each end of each section by joint means including a pair of generally vertically extending structural angle members 30, disposed on opposite sides of the troughs, respectively, and having laterally extending flanges lying in the plane of the ends of the cross sections. The interconnecting members 30 are preferably spot welded to the sides of the troughs 27, 28, and the laterally extending flange portions of the members 30 on adjoining sections are adapted to lie in abutment in assembled position and are secured together by bolts 31. The troughs 27, 28 are interconnected near the center of each of the sections by a bracing member 32, disposed generally perpendicular to the two troughs and spot welded thereto. Each trough section is also provided with diagonal bracing members 33, 34 extending from the upper ends of the angle members 30 and converging downwardly and connected with the lower ends of the intermediate braces 32, respectively, and spot welded to the sides of the conveyor troughs 27, 28. Each of the bracing members 32, 33, 34 is formed of sheet metal with a longitudinally extending ridge 35, best shown in Figure 12.

The two troughs 27, 28 are generally similar, but the side walls of the upper trough 27 have their upper edges turned outwardly and downwardly, as indicated at 36, over the upper ends of the angle members 30. The lower ends of the latter are flush with the bottom edge of the lower trough 28. The bottom 40 of the upper trough 27 is pressed upwardly along opposite sides thereof to provide a pair of longitudinally extending shelves 41, elevated slightly above the central part of the bottom 40. The lower trough 28 has the central portion of its bottom 42 pressed upwardly, thereby defining a pair of channel portions 43 depressed below the main portion of the bottom 42, and extending longitudinally of the elevator sections. The shelf portions 41 of the upper trough and the depressed portions 43 in the corners of the lower trough serve to strengthen and rigidify the troughs 27, 28 and also serve other important purposes, as will be made clear later. The upper edges of the side walls of the lower trough 28 are turned inwardly to form flanges 44.

The elevator frame 21 is supported on the transport truck 22, which comprises a transverse axle means, here in the form of a bar 48 of circular cross section having outwardly and downwardly inclined portions 49, the outer end portions 50 of which are disposed in axial alignment and are normally horizontal. The inner ends of the aligned end portions 50 are interconnected by a structural angle member 51, preferably welded rigidly thereto. Thus, the raised central portion of the bar 48 and the angle member 51 form a rigid truss member for supporting the greater part of the weight of the elevator frame 21.

A pair of sleeves 52, 52' are disposed coaxially embracing the ends 50 of the axle 48, the inner ends of the sleeves being rigidly fixed, as by welding, to a pair of plates 53, 53', through which the axle end portions 50 extend. The plates 53, 53' constitute lever arms, which extend above and below the axle end portions 50, the upper ends of the plates 53, 53' being rigidly secured by bolts 54 to a pair of generally horizontal draft members 55, 55', respectively. The draft members 55, 55' are in the form of structural angle members connected at their forward ends to a pair of connecting plates 56, 56' by bolts 57, best shown in Figure 10. The connecting plates are rigidly fixed, as by welding, to a transverse tubular frame member 58, which is journaled at opposite ends, respectively, in a pair of supporting plates 59, 59', which are rigidly bolted to the upper and lower troughs 27, 28 and extend downwardly therefrom on opposite sides of the elevator frame. The transport truck 22 is carried on a pair of supporting wheels 60, 60' having hubs 61, 61' journaled on the sleeves 52, 52', respectively. The wheels are preferably provided with rubber tires 62, 62' which permit the elevator to be transported at reasonably high speeds along the highway. Thus it is evident that the transport truck 22 is pivotally connected to the receiving end of the elevator frame 21 by means providing for vertical swinging movement of the frame relative to the transport truck and its draft members 55, 55'.

The discharge end of the conveyor frame 21 is carried on a boom comprising a pair of structural angle members 65, 65' swingably connected by pivot bolts 66, 66' at their lower ends on the lower ends of the lever arms 53, 53', respectively (see Figures 5 and 6). The upper ends of the boom members 65, 65' are rigidly secured by bolts 67 to connecting plates 68, which are fixed, as by welding, to the opposite ends of a transverse tubular member 69, respectively (see Figures 12 and 13). The tubular member 69 is mounted on a truck 70, which comprises a transverse tubular brace 71, through which the tubular member 69 extends coaxially and is rotatable therein. The tubular member 71 is mounted on a pair of truck side plates 72, 72' disposed at opposite ends thereof, respectively. The truck 70 is provided with a pair of longitudinally spaced transverse axles 73, 74. A pair of flanged wheels or rollers 75, 75' is journaled on one of the axles 74 and a second pair of rollers 76 is journaled on the other axle 73. The wheels or rollers are secured on the axles by cotter pins 77 and are prevented from sliding inwardly thereof by collars 78 on the axles. The flanges 79 are disposed on the inner ends of the rollers and engage the inner sides of the channels 43 in the bottom 42 of the lower trough 28, the rollers being adapted to roll along the bottoms of the channels 43, respectively, without conflict with the section joint means 30—31. Thus, the weight of the outer end portion of the elevator frame 21 is transmitted through the four wheels or rollers and their supporting axles to the truck side plates 72, 72', which are mounted on the tubular truck member 71, which is journaled on the tubular member 69, the latter being carried on the ends of the boom members 65, 65'. Inasmuch as the truck 70 is free to rock about the axis of the tubular member 69, the weight of the discharge end of the elevator frame is distributed substantially equally upon the four supporting rollers, which roll longitudinally of the elevator frame 21 as the boom 65—65' is swung vertically about the pivot axis of the pivot bolts 66, 66'.

The boom 65—65' is raised and lowered by lifting mechanism, indicated in its entirety by reference numeral 80, mounted on a lifting structure comprising a mast structure 81. The mast structure 81 comprises a pair of laterally spaced tubular mast members 81, 81', the lower ends of which rest on the transverse structural angle member 51 and are rigidly fixed thereto, as by welding. The mast members 81, 81' are also fixed, as by welding, to the axle member 48, and extend upwardly on opposite sides, respectively, of the main elevator frame 21. The lifting mechanism 80 comprises a transverse shaft 82 journaled in a pair of bearing brackets 83, 83', which are rigidly fixed to the mast members 81, 81', respectively. A pair of winding drums 84, 84', are fixed to the shaft 82 in laterally spaced relation. The drums are connected with the boom 65—65' by means of a single lifting cable 85, the two ends of which are attached to the drums 84, 84', respectively, and are wound thereon. The two runs of the cable 85 pass upwardly along the masts 81, 81' and pass over a pair of sheaves 86, rotatably mounted at the tops of the masts 81, 81', respectively, and extend from the sheaves 86 to the truck 70 on the end of the boom 65—65', the cable 85 extending through the tubular member 69. The cable 85 is free to slide axially within the tubular member 69 in order to equalize the pull on the two runs of the cable between the truck 70 and the lifting mechanism 80. The drum shaft 82 is rotated by means of a worm gear 87 disposed in mesh with a worm 88 journaled on one of the bearing brackets 83. A manually actuated crank 89 is fixed to the worm 88 for the purpose of rotating the latter to wind the lifting drums 84, 84' to raise or lower the boom 65—65', causing the elevator frame 21 to swing vertically between the transport position shown in Figure 1 and the operating position shown in Figure 3.

The portion of the weight of the elevator frame 21 which is transmitted downwardly through the boom 65—65' is applied to the lower ends of the lever arms 53, 53', tending to turn the latter angularly about the axis of the wheel axles 50, in a clockwise direction, as viewed in Figures 1, 3 and 5, which in turn tends to swing the adjacent ends of the draft members 55, 55' in a clockwise direction about the axis of the axles 50 and also to apply a tensional force in the draft members, with the result that any tendency for the members 55, 55' to sag is eliminated, or at least reduced. This is especially beneficial during transport of the elevator, for it not only prevents the draft members from scraping on the ground, but also reduces the vibration thereof during transport.

In transport position the central portion of the long elevator frame 21 is supported on a transverse tubular frame bar 90, which rigidly interconnects the two mast members 81, 81' above the lifting shaft 82. A pair of laterally spaced supporting pads or stirrups 91, 91' are rigidly fixed to the transverse frame bar 90 to receive the bottom rails 43 of the elevator troughs in lowered position of the latter. The upper ends of the mast members 81, 81' are braced by means of a pair of guy cables 92, extending downwardly toward the receiving end of the main frame and secured at 93 to the central bracing members 32 on the receiving section 23 of the main frame.

The elevator is transported by connecting the receiving end of the main frame to a tractor or other draft vehicle, indicated by reference numeral 100, comprising a fore and aft extending body 101 carried on a pair of traction wheels 102 and provided with a drawbar 103 in the usual manner. The end of the receiving section 23 of the elevator frame is provided with a hitch device 104 adapted to be supported on the drawbar 103 for supporting the receiving end of the main frame and for transmitting draft to transport the elevator. The hitch device 104 comprises a pair of ball and socket elements 105, 106 assembled one within the other, as best shown in Figures 8 and 9. The socket member 106 is provided with a stud 107 extending downwardly from the lower side thereof and adapted to be inserted through an aperture in the tractor drawbar 103. The stud 107 is threaded to receive a nut 108, which serves to rigidly secure the socket 106 to the drawbar. The ball element 105 is carried on the end of a neck portion 109, which curves forwardly and downwardly from a triangular base 110, which is curved to fit the surface of a boot section 111 on the lower end of the elevator. The base plate 110 is rigidly fixed to the boot 111 by bolts 112.

The receiving end of the main frame can be easily disconnected from the tractor drawbar 103 by removing the nut 108, after which the frame is lowered to the ground by means of a convenient jack lever 115 of tubular construction and adapted to receive any suitable crowbar or other long tool 114 for obtaining a mechanical advantage. The lever 115 is provided with a curved mounting portion 116, best shown in Figures 10 and 11, which embraces the transverse tubular member 58 over the upper half thereof and is rotatable relative thereto. A pair of lugs 117 are rigidly fixed, as by welding, to the transverse tubular member 58 and overlie the side edges of the mounting portion 116, having clearance thereunder to permit rotation of the portion 116 relative to the tubular member 58. The outer end of the lever 115 is provided with a pair of laterally spaced downwardly projecting lugs 118, adapted to receive therebetween a vertical leg 119, which is swingably connected to the lugs 118 by means of a suitable pin 120. A foot or base plate 121 is fixed to the bottom of the leg 119 and adapted to bear upon the ground. During transport, the leg 119 is inserted into the open end of the tubular lever arm 115 the tool 114 having been removed from the arm 115 and is secured therein by removing the pin 120 from the end of the leg 119 and lugs 118 and by inserting the pin through an aperture 122 in the top of the lever arm 115 and through an aligned opening (not shown) extending transversely through the leg 119 near the end thereof. The lever arm 115 is disposed at an angle to the tubular member 58, providing for resting the other end of the leg 119 on top of the draft member 55' during transport, as indicated in dotted lines in Figure 10.

To lower the elevator to operating position on the ground, the leg 119 is connected by the pin 120 to the downwardly extending lugs 118 on the lever arm 115, after which the crowbar 114 is inserted through the lever arm 115 and under the transverse member 58. A downward pressure on the end of the crowbar 114 exerts a lifting force through the lever 115 to the tubular member 58, and the reaction is transmitted through the leg 119 to the base plate 121 on the ground. By this means, the frame 21 is raised to withdraw the stud 107 from the tractor drawbar 103, after which the lever 114 can be slowly raised, permitting the main frame to be lowered to a ground engaging position, as shown in Figure 3.

The elevating mechanism comprises a pair of laterally spaced endless chains 125, 125' disposed on the longitudinally extending shelves 41 in the upper trough 27, and curving downwardly around a pair of laterally spaced sprockets 126 disposed within the boot 111 and mounted on a transverse drive shaft 127 journaled in opposite side walls 128, 128' of the boot section 111, respectively. The return flights of the chains 125, 125' extend upwardly through the lower trough 28. Scraper blades 130 are spaced apart longitudinally of the chains 125, 125' and extend transversely between the latter and are secured to the same by brackets 131. Each of the blades has its lower corners cut out, as indicated at 132 (Figure 13), to receive the shelves 41 on which the chains 131 slide, so that the blades 130 extend downwardly between the shelves 41 and scrape along the bottom 40 of the upper trough 27, thereby propelling loose material such as grain, gravel, or the like upwardly along the upper trough 27 during operation. As the elevator blades 130 pass around the sprockets 126 within the boot 111, their inner edges slide on a scroll or plate 135 which extends across the conveyor between the sprockets 126 and has one end overlying the lower edge of the bottom 40 of the upper trough, the opposite edge of which is curved downwardly, as indicated at 136, around hubs 137 on the drive shaft 127. Thus, the scroll plate 135 serves as an extension within the boot portion 111 of the bottom 40 of the trough 27.

A hopper 140 is provided at the receiving end of the elevator for receiving the material to be conveyed thereby and feeding it to the receiving section 23 of the elevator. The hopper 140 is in the form of a sheet metal trough having upper and lower vertically spaced trough bottoms 141 and 142 extending between side walls 143, 143' of the hopper 140, as best shown in Figures 8 and 9. The sides 143, 143' of the hopper 140 are swingably connected to a transverse shaft 144, journaled at opposite ends, respectively, in a pair of upwardly extending side sheets 145, 145', which are fixed to the sides of the upper trough 27. The hopper 140 is provided with a conveyor in the form of a pair of laterally spaced chains 146, 146' interconnected by a plurality of longitudinally spaced blades 147 which scrape along the bottom 141 in the upper trough of the hopper and curve downwardly around a pair of sprockets 148, 148' mounted on the shaft 144 adjacent the side walls 143, 143' of the hopper. The return flight of the conveyor extends beneath the upper bottom 141 and above the lower bottom 142. Material that is deposited in the hopper is scraped along the upper bottom 141 by the blades 147 which convey the material toward the boot 111 and discharge the material into the upper trough 27 of the elevator.

In order to prevent the grain or other loose material from leaking between the hopper sides 143, 143' and the side sheets 145, 145' of the elevator, sealing means is provided in the form of laterally outwardly extending flanges 149, 149', which turn outwardly from the side walls 143, 143' and are fixed thereto. Each of the flanges 149, 149' extends around the inner edge of the associated side wall 143, 143' and is adapted to scrape upon the inside surfaces of the side sheets 145, 145'. The flanges are maintained in scraping engagement with the side sheets by adjusting the latter laterally with respect to the flanges. This adjustment is accomplished by means of a pair of brace rods 150, 150', which are rigidly fixed, as by welding, to the side sheets 145, 145', respectively, and extend downwardly in outwardly diverging relation therefrom. The lower ends of the brace rods extend through suitable apertures in a pair of flanges 151, 151' turned outwardly from the upper edges of the side walls 128, 128' of the boot section 111, respectively. The lower ends of the brace rods 150, 150' are threaded to receive a pair of adjusting nuts 152, 152' threaded on the rods above and below the associated flanges 151, 151', respectively. By adjusting the nuts downwardly on the threaded rods, the latter are forced upwardly, tending to bend the side sheets 145, 145' laterally inwardly into engagement with the outwardly turned flanges 149, 149' on the hopper walls 143, 143'.

The pivoted end of the hopper 140 is provided with a sealing blade or flange 155, which extends downwardly from the lower bottom 142 and is fixed thereto. The flange 155 extends laterally between the two sides 128, 128' of the boot section 111 and is adapted to slidably engage a curved extension 156 of the end wall of the boot 111, the extension 156 being curved around the axis of the shaft 144 about which the hopper is pivoted. Thus, the sealing blade 155 maintains its sliding or scraping engagement with the curved surface 156 of the end wall as the hopper is swung vertically about the axis of the shaft 144, thereby preventing leakage of material between the curved surface 156 and bottom 142 of the hopper 140.

The raising and lowering of the hopper 140 is facilitated by means of a counterbalancing mechanism comprising a generally vertically extending bail 160 pivotally connected at 157 to the sides of the upper trough 27 and arching over the latter. A pair of links 161, 161' are swingably connected with the upper portion of the bail 160 and extend downwardly and are swingably connected at 162 to the side walls 143, 143', respectively. A pair of tension springs 163, 163' are connected to the upper ends of the links 161, 161', respectively, and anchored at their opposite ends to ears 164, 164' on the sides of the upper trough 27. When the hopper is lifted to the transport position shown in Figure 1, the springs contract, causing the bail 160 to lie across the top of the upper trough 27 while the springs 163 lie along the upper edges of the trough 27 and do not interfere with the conveyor chains in the elevator frame 21. In this position the links 161 also lie along the upper edges of the upper trough 27, so that it will be evident that inasmuch as the links and chains do not have any tendency to drop into the upper trough, the hopper can be raised at any time during operation without the necessity for stopping the elevating mechanism. This is essential to proper operation, for the hopper 140 must be raised for each truck or wagon that brings material to dump into the troughs, to permit the truck or wagon to pass under the elevator without the necessity for backing the wagon into dumping position.

The upper end of the elevator frame is provided with a head 170, best shown in Figures 2, 14 and 15. The head section 170 comprises a pair of laterally spaced side walls 171, 171' disposed in alignment with the sides of the conveyor troughs 27, 28, respectively, and interconnected by a transverse end plate 172 beneath the end of the elevating mechanism. The transverse shaft 173 is journaled at opposite ends thereof, respectively, in the side walls 171, 171', in bearing members 174 which are shiftable along a line parallel to the elevator frame 21. The conveyor chains 125, 125' are trained around a pair of sprockets 175 fixed to the shaft 173. The shaft 173 extends outwardly through slots 176, providing for adjusting the bearings 174 and shaft 173 longitudinally of the frame to adjust the tension in the chains 125, 125'. A scroll plate 177 has an outer end portion 178 which curves about the shaft 173 and is journaled thereon, the lower end of the plate 177 extending under the upper edge of the bottom 40 of the upper trough 27. The scroll plate 177 is free to slide relative to the bottom 40 when the shaft 173 is adjusted longitudinally of the slots 176. Any suitable conventional mechanism, indicated generally by reference numeral 179 (Figure 2) is provided for adjusting the bearings 174 to tighten the conveyor chains 125, 125'.

The head 170 is provided with a bottom opening 180 between the side walls 171, 171' and the end wall 172, and beneath the end of the conveyor. When grain or other loose material is being handled by the elevator, a hopper 181 is secured by bolts to holes 182 around the lower edge of the opening 180, and the hopper 181 is provided with a swingable spout 183 of conventional design, which can be rotated from a transport position shown in Figure 2 in solid lines to an operating position indicated in dotted lines for dscharging the materal into a suitable container. When the elevator is handling grain or other loose material, a deflecting hood 185 is secured between the side walls 171, 171' of the head 170 directly in longitudinal alignment with the elevator troughs 27, 28. The lower edge of the hood overlaps the upper edge of the end wall 172 and receives the grain that is thrown forwardly from the blades 130 of the conveyor as they move around the sprockets 175. The grain is deflected by the hood 185 and slides downwardly under the end of the conveying chains into the hopper 181 and spout 183.

When the elevator is used for elevating bales of hay or other large objects, the hood 185 is removed to provide a clear channel for the bales between the walls 171, 171'. The bales drop from the end of the conveyor onto a chute 186 which has laterally spaced flanges or sides 187, 187', which convey the bales downwardly away from the end of the elevator to any suitable point of reception. Figures 14 and 15 show the elevator conditioned for handling bales, with the hopper 181 and the hood 185 removed, but indicating the latter in dotted lines. The upper edge of the chute 186 is secured by bolts 188 to a structural angle member 189 extending transversely across the upper edge of the end plate 172.

Power is supplied for driving the elevator by a power plant 195 in the form of a small internal combustion engine carried on the transport truck 22, although an electric motor or other form of drive can be used if desired. The motor 195 is provided with a drive pulley 196 connected by a flexible power transmitting belt 197 to a pulley 198 attached to a power shaft 199 journaled in bearings 200 secured to the bracket plates 59, 59', respectively, the shaft 199 extending between the upper and lower troughs 27, 28. A sprocket 201 is mounted on the shaft 199 on the opposite side of the main frame from the pulley 198 and drives a sprocket 202 fired to the shaft 127, through a flexible chain 203, see Figures 8 and 9. A second sprocket 204 is mounted on the end of the shaft 127 adjacent the pulley 198, and supplies power to drive the conveyor chains 146 in the hopper 140 through a chain 205, which is trained over a sprocket 206 on the drive shaft 144.

The motor 195 is provided with a base 210 having a flange 211 secured by bolts 212 to a pair of wooden beams 213 extending longitudinally beneath the main frame 21. The beams 213 are carried on a supporting platform, indicated generally by the reference numeral 214, comprising a pair of transversely disposed longitudinally spaced structural angle members 215, 216, best shown in Figures 5, 6 and 7. The beams 213 are secured to the angle members 215, 216 by means of bolts 217, which extend vertically through aligned apertures therein and through a bar 218 which lies on top of the beams 213 and interconnects the same. The transverse members 215, 216 are carried on a pair of longitudinally extending angle members 219, 220, which are pivotally connected by bolts 221 to the generally vertical mast members 81, 81', respectively. Each of the transverse members 215, 216 is provided with end flanges or lugs 222 secured thereto, as by welding, and adapted to hook over the edges of the longitudinal members 219, 220 to prevent lateral shifting of the transverse members relative to the longitudinal members. Clips 224 are secured by bolts 225 to the transverse members 215, 216 and engage the bottom sides of the horizontal flange portion 226 of the longitudinal members 219, 220, as best shown in Figure 7. The clips 224 are provided at each end of each of the members 215, 216, and by tightening the bolts 225, the motor base is secured to the longitudinal members 219, 220.

The ends of the longitudinal members 219, 220 are rigidly interconnected by a tubular frame member 230, see Figure 5, adjacent the pivot bolts 221. A threaded drawbolt 231 is rigidly fixed to the central portion of the transverse member 216 and extends rearwardly through the transverse tubular member 230 and is provided with a nut 232 behind the member 230. By tightening the nut 232 on the threaded rod or drawbolt 231, the motor can be shifted in a direction away from the receiving end of the conveyor, to tighten the belt 197. During the shifting movement, the transverse members 215, 216 slide along the longitudinal rails 219, 220.

During transport, the forward end of the platform 214 is carried on a pair of tension rods 235, which are fastened by bolts 236 to the two masts 81, 81', respectively, and extend downwardly and forwardly and are secured to a pair of studs 237 rigidly fixed, as by welding, to the forward ends of the two longitudinal platform members 219, 220, respectively. Although it is necessary to carry the platform from the mast structure during transport, it is preferable to support a major portion of the weight of the motor on the ground during operation, to eliminate vibration. To this end, the platform 214 is provided with a retractable supporting device 240, which is shown in ground engaging position in Figures 3, 5 and 6 and in retracted transport position in Figure 1. The tension members 235 are removed from the studs 237 when the retractable stand 240 is carrying the platform.

The retractable stand comprises a sleeve portion 241 having laterally extending brackets 242 secured by bolts 243 to a transverse frame member 244, which rigidly interconnects the forward ends of the longitudinal platform members 219, 220. The sleeve member 241 is supported in a vertical position to receive a vertical leg 245, which is slidable vertically within the sleeve 241 between retracted and operating positions. A latch dog 246 is pivoted at 247 between a pair of legs 248, which are formed integrally with the vertical sleeve 241. The end of the latch dog 246 is urged into contact with the side of the leg 245 by a compression spring 249 beneath the handle portion of the latch dog 246. The dog 246 is adapted to engage in an aperture 250 in the leg 245 near the bottom thereof to hold the leg in upwardly retracted position.

The upper end of the leg 245 above the sleeve support 241 is provided with a pair of spaced arms 255, rigidly fixed thereto, and between which is carried an internally threaded nut member 256 on a pair of trunnions 257 journaled in suitable apertures in the arms 255. A threaded rod 258 extends through the trunnioned nut 256 and is provided at its upper end with a crank 259. The lower end of the rod 258 is provided with a head 260 which is engaged beneath a pair of forwardly extending lugs 261, spaced apart to receive the rod 258 therebetween. When the platform 214 is carried on the tension members 235, the threaded rod 258 can be swung about the transverse axis of the trunnions 257 to swing the head 260 out from between the lugs 261, after which the leg 245 can be raised by pulling upwardly on the rod 258 until the dog 246 engages the aperture 250 to hold the same in raised position. With the head engaged beneath the lugs 261, however, the weight of the platform 214 can be transferred from the tension links 235 to the leg 245 by turning the crank 259, stressing the rod 258 in tension between the head 260 and the nut 256. A retractable support of this type is disclosed and claimed in Patent 2,245,935 granted June 17, 1941, to Neighbour and Court.

With the type of supporting structure disclosed herein, elevators of fifty foot lengths can be transported at reasonably high speeds without the necessity for disassembling or folding the main frame 21. The frame is approximately balanced on the transport truck 22, with a slight overbalance tending to apply some weight through the hitch device 104 to the drawbar 103. The central portion of the frame 21 is carried on the stirrups 91 on the mast structure 81, while the rear end of the frame is carried on the boom 65—65'. The ball and socket connection 104 prevents any lost motion between the main frame and the drawbar, thereby preventing any yawing of the elevator during transport. The hopper 140 in transport position inclines slightly rearwardly to position the center of gravity behind the pivot axis of the shaft 144. The ball and socket hitch connection 104 also permits the elevator to be positioned in its operating position by backing the tractor and elevator up to the barn or warehouse into which the material is to be delivered and the elevator is raised by turning the crank 89, to wind the lifting cable 85 on the drums 84, 84', whereupon the boom 65—65' is raised, the carriage 70 rolling downwardly on the rail portions 43 of the frame structure 21. When the frame is in raised position, the leg 119 can be attached to the lever arm 115, and after the nut 108 is removed from the stud 107, the boot of the elevator can be lowered into ground engaging position. The tractor 100 is then moved out of the way, to permit the hopper 140 to be swung forwardly onto the ground. The retractable stand 240 is then placed in ground engaging position and the weight of the motor is relieved from the links 235 by turning the crank 259, after which the links are disconnected from the studs 237. The engine 195 is then started, to bring the pulley 198 up to speed. A clutch 262 of any conventional design can be interposed between the pulley 198 and the counter shaft 199, the clutch 262 being engaged and disengaged under control of a crank 263.

We claim:

1. A portable elevator comprising, in combination, a long main frame, elevating means associated therewith, a transport truck therefor, a boom pivotally mounted on said truck and extending longitudinally beneath said frame, a transverse tubular member mounted at the outer end of said boom, a truck frame mounted on said tubular member by means providing for rocking movement relative to said frame about the axis of said member, a pair of wheels mounted at each side of said truck and adapted to roll on the bottom of said frame for supporting the latter on said boom, a boom lifting structure supported on said transport truck and having a pair of laterally spaced cable winding drums carried thereon, a single cable extending through said tubular member and having its ends wound upon said drums, respectively, and means for rotating said drums simultaneously to raise and lower said boom.

2. A portable elevator comprising a long main frame having a receiving end adapted to rest on the ground and a discharge end adapted to be raised to an inclined operating position, a transport truck therefor including transverse axle means disposed beneath the central portion of said frame, a pair of supporting wheels journaled thereon, and a pair of generally horizontal draft beams pivotally connected at opposite ends, respectively, with said main frame adjacent the receiving end of the latter and with said axle means, in laterally spaced arrangement, arms fixed to said beams adjacent said axle means and extending downwardly therefrom and generally toward the discharge end of the main frame, a boom comprising a pair of laterally spaced members pivotally mounted on the lower ends of said arms, respectively, and extending longitudinally beneath said main frame toward said discharge end of the latter, a carriage mounted on the free ends of said boom members and shiftable along the bottom of the frame for raising and lowering the latter by swinging said boom, the weight of said frame and boom being transmitted through said arms tending to reduce the amount of sag in said draft beams.

3. A portable elevator comprising a long main frame having elevating means carried thereon, a transport truck therefor including a transverse axle, a pair of supporting wheels mounted thereon, and frame members for supporting said main frame on said axle including a pair of generally horizontal draft members extending from said axle toward one end of said main frame, a motor support comprising a platform pivotally supported at one end on said truck and extending generally horizontally between said draft members, a retractable leg for supporting the other end of said platform on the ground and independently of the draft members during operation, and means for carrying said other end of said platform on at least one of said draft members during transport, with said leg retracted.

4. A portable elevator comprising a long main frame having a receiving end adapted to rest on the ground and a discharge end adapted to be raised to an inclined operating position, a transport truck therefor including transverse axle means disposed beneath the central portion of said frame, a pair of supporting wheels journaled thereon, and a pair of generally horizontal draft beams pivotally connected at opposite ends, respectively, with said main frame adjacent the receiving end of the latter and with said axle means, in laterally spaced arrangement, a hitch device mounted on said receiving end of said frame and adapted to be attached to a tractor for supporting and transmitting draft force to the receiving end of said frame, and means for raising and lowering said receiving end of said frame to and from its mounted position on the tractor, including a member extending transversely between said draft beams, a lever swingably mounted on said transverse member for vertical swinging movement, a leg attached to said lever and shiftable by the latter into engagement with the ground, and means for retaining said leg out of ground engaging position during transport.

5. A portable elevator comprising a long main frame, a transport truck therefor including transverse axle means, a supporting structure for said frame rigidly connected to said axle means, a pair of generally horizontal draft members, a pair of sleeves embracing said axle means and rigidly fixed to said draft members, respectively, and a pair of supporting wheels journaled on said sleeves.

6. A portable elevator, comprising, a transport truck having a generally longitudinal draft frame including a wheeled support for carrying the draft frame on the ground; elevating means on the truck including a movable part; means on the truck for carrying a motor to operate said movable part and including a motor support having first and second end portions, the first pivoted to the draft frame adjacent one end of the draft frame and the support extending therefrom toward the other end of the draft frame to dispose its second end portion in longitudinally spaced relation to its first end portion; means for supporting said second end portion of the motor support on the ground and independently of the draft frame during operation of the elevator; and means for supporting said second end portion of the motor support on the draft frame during transport thereof.

7. A portable elevator comprising a pair of upper and lower sheet metal troughs at least the lower trough being made up of a plurality of sections disposed in end-to-end relationship and having joint means at their outer sides interconnecting the sections, means securing said troughs together to provide a unitary frame, a supporting truck for said frame, a boom pivotally mounted on said truck and extending longitudinally beneath said frame, and a pair of laterally spaced wheels journaled on said boom and having radial flanges on their inner edges only so as to avoid conflict with the aforesaid outer joint means, said lower trough having depressed channels therein extending along opposite sides thereof, the bottom surfaces serving as rails to receive said wheels to provide clearance beneath the bottom of the trough for said flanges, and also serving to stiffen the trough.

8. A portable elevator, comprising: a base; an elongated conveyor structure carried by the base and extending from a lower, receiving end to an upper discharge end; means on the base for effecting elevation and depression of the discharge end of the conveyor structure, including cable-control means on the base located intermediate the ends of the conveyor structure, and a vertically swingable boom having one end pivotally connected to the base proximate to the cable-control means, said boom extending toward the discharge end of the conveyor structure and having its other end remote from the cable-control means and engageable below the conveyor structure, carriage means mounted on said remote end of the boom and including a pair of longitudinal members connected to said remote end of the boom and each member having a pair of longitudinally spaced-apart rollers engaging the conveyor structure from below, each member having a through aperture therein and said apertures being transversely alined; and cable means passing through said apertures and extending back to the cable-control means.

9. A portable elevator, comprising: a base; an elongated conveyor structure carried by the base and extending from a lower, receiving end to an upper discharge end; means on the base for effecting elevation and depression of the discharge end of the conveyor structure, including cable-control means on the base located intermediate the ends of the conveyor structure, and a vertically swingable boom having one end pivotally connected to the base proximate to the cable-control means, said boom extending toward the discharge end of the conveyor structure and having its other end remote from the cable-control means and engageable below the conveyor structure, said boom including at said remote end a pair of elements spaced apart transversely and extending lengthwise of the conveyor structure and downwardly to the base end of the boom; carriage means mounted on said elements, including a longitudinal member connected intermediate its ends to each element and having a pair of longitudinally spaced-apart rollers engaging the conveyor structure from below, each member having a through aperture intermediate its rollers and said apertures being transversely alined; and a single cable passing through said apertures and extending back to the cable-control means.

10. A portable elevator comprising a long main frame having elevating means carried thereon, a transport truck therefor including transverse axle means, a pair of supporting wheels journaled thereon, and a generally horizontal draft member for said truck having a pivotal connection with one end of said main frame and extending beneath the latter toward the other end and supported on said axle means, an arm rigidly fixed to said draft member adjacent its axle supported end and projecting therefrom in a direction toward said other end of the main frame, a boom pivotally mounted on said arm and extending longitudinally beneath said main frame to a point near said other end of said main frame, and supporting means between the boom and said other end of the main frame at said point for carrying the weight of the main frame on said truck, said weight being transmitted through said arm tending to reduce the amount of sag in said draft member.

LEONARD B. NEIGHBOUR.
HOWARD C. ESBECK.

REFERENCES CITED

The following references are of record in the file of this patent:

UNITED STATES PATENTS

| Number | Name | Date |
|---|---|---|
| 635,809 | Richardson | Oct. 31, 1899 |
| 811,189 | Webster | Jan. 30, 1906 |
| 1,095,077 | Brown et al. | Apr. 28, 1914 |
| 1,150,091 | Adams et al. | Aug. 17, 1915 |
| 1,244,024 | Brown | Oct. 23, 1917 |
| 1,346,678 | Pratt | July 13, 1920 |
| 1,613,923 | Bixby | Jan. 11, 1927 |
| 1,893,917 | Walker | Jan. 10, 1933 |
| 2,078,379 | Grayson et al. | Apr. 27, 1937 |
| 2,091,505 | Griffith | Aug. 31, 1937 |
| 2,136,560 | Nichols | Nov. 15, 1938 |
| 2,354,990 | Gilbert et al. | Aug. 1, 1944 |
| 2,388,921 | Kooiker | Nov. 13, 1945 |
| 2,415,013 | Kubitz | Jan. 28, 1947 |

FOREIGN PATENTS

| Number | Country | Date |
|---|---|---|
| 767,494 | France | May 1, 1934 |
| 840,738 | France | Jan. 23, 1939 |